Figure 1:
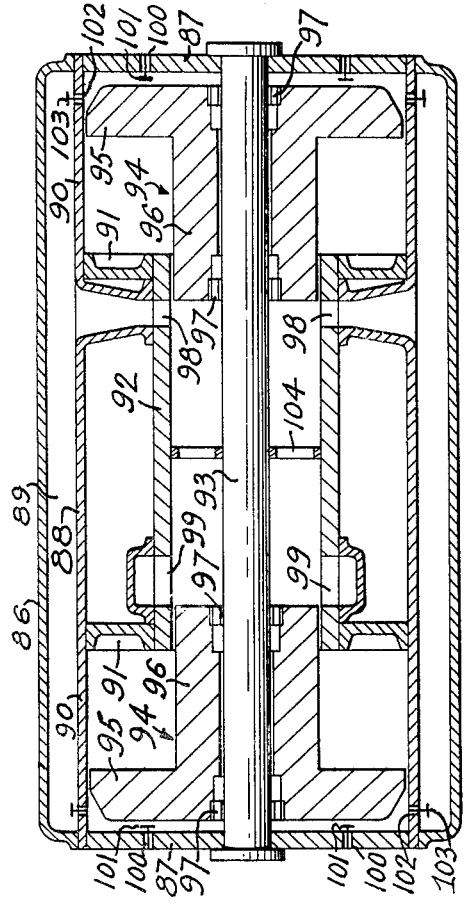

June 14, 1966  A. BRAUN  3,255,742
FREE PISTON MACHINE
Original Filed Nov. 21, 1960

United States Patent Office 3,255,742
Patented June 14, 1966

3,255,742
FREE PISTON MACHINE
Anton Braun, 25 Lakeland Point Drive, Kingston,
Ontario, Canada
Original application Nov. 21, 1960, Ser. No. 70,650.
Divided and this application Mar. 19, 1964, Ser. No. 353,123
2 Claims. (Cl. 123—46)

This invention relates to free piston machines. This application is a division of application Serial No. 70,650, filed November 21, 1960.

In free piston machines, a pair of stepped pistons work together in opposed reciprocating motion within a common engine cylinder to which, usually on each end thereof, a compressor cylinder is coaxially arranged and in which the larger diameter portions of the stepped pistons work. Depending on the principle according to which such machines work, that is, whether they work with the compression of the air within the compressor parts during the outward stroke, or during the inward stroke or possibly during both strokes, it is more or less important, and in certain cases, imperative to incorporate in a machine a bounce structure. However, conventional bounce structures, particularly in engines of the outward compression type, are subject to several disadvantages. Thus, they usually involve the use of many additional parts, sometimes of relatively complicated form, and they undesirably increase the bulk of the engine.

Furthermore, in usual free piston machines, the pistons, during their reciprocating motion, are supported on working surfaces of the machine. Since the pistons at different loads have different temperatures, they change in size with respect to the size of the cylinders in which they reciprocate. Moreover, the diameters of, for instance, the diesel portions of the pistons are not the same over their entire lengths. If careful production procedures are applied, the pistons can be machined such that the diameters over their entire lengths at one load condition are fairly equal, but this is not so for other loads. To overcome the problems incident to this problem, so-called wear bands have been employed. These wear bands are attached to the pistons and are made from a material that wears well under the engine conditions. Since, however, such wear bands are still in contact with the hot working cylinder surfaces they are subject to chemical as well as excessive mechanical wear and must be replaced frequently. This problem would be more serious in engines of shorter design than usual since the length of hot contact would be relatively longer.

Another common characteristic of free piston engines is that the thermal load in the combustion or diesel section is a governing factor in respect of maximum possible efficiency. The thermal load must be in such a range that the piston rings having regard to the lubrication will safely stand the load. There are other problems such as the provision of material for the piston crowns that will withstand the high temperatures in the combustion section, but such problems are less severe and some solutions therefor have been provided such as, for instance, cooling of the piston crowns. The usual way of dealing with piston rings and lubrication and the corresponding wear problems is to improve the contacting materials, which, in many cases, results in higher costs, or to improve the lubricants or utilize new lubricants that will stand the higher thermal loads associated with higher efficiency, a step which also results in higher costs. There is, therefore, an economical limit in respect of the maximum efficiency at which an engine may be operated, even in those cases where the fuels and engine cycles used permit such operation of engines at higher efficiency.

In high speed engines, it is also difficult to find sufficient space particularly for the compressor delivery valves. It is partly for this reason that the velocities in these valves are very high which results in a lower life expectancy for the valves.

It is a general object of this invention to provide a free piston machine of simplified construction, of more compact form, and of improved operating efficiency.

A more specific object is to provide a ringless piston structure for free piston engines having a supporting means therefor involving absence of mechanical contact between the pistons and cylinder in the combustion section thereof whereby lubrication and cooling means are avoided, the clearance between pistons and cylinder being kept to a minimum whereby undesirable leakage is eliminated.

Another object is to provide a bounce structure for free piston machines which avoids the need of additional parts and which thereby improves the engine design whereby its efficiency is increased, its construction is simplified and its operation is rendered safer.

Another specific object is to provide piston assembly bearings that are remote from the hot working surfaces and can therefore be kept at very safe temperatures.

Another object is to provide a free piston machine wherein the thermal load problem is avoided in an inexpensive manner resulting in a less costly, safer, more efficient and lighter engine.

Another object is to provide a free piston engine having a compact valve arrangement with consequent space conservation and resulting in safer operation.

Figure 2:
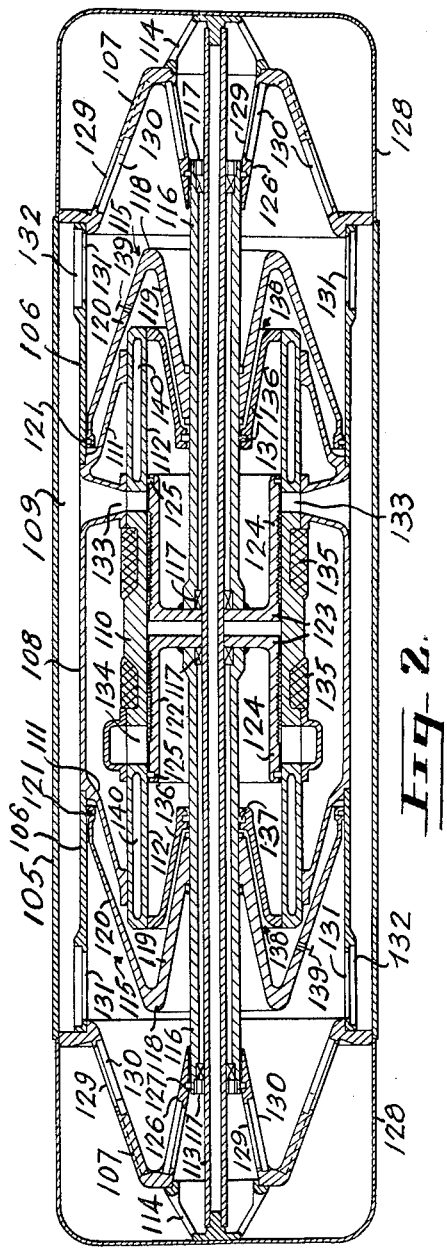

The invention will be described with reference to the accompanying drawing, in which FIGURE 1 is a sectional side elevation of a free piston engine in accordance with the invention, and FIGURE 2 is a sectional side elevation of a modified form of free piston engine in accordance with the invention.

Referring to FIGURE 1, 86 is a generally cylindrical casing having end walls 87. Mounted within the casing is a cylindrical member 88 arranged in concentric spaced relation thereto to provide a passage 89 therebetween. The end portions of member 88 constitute compressor cylinders 90 defined by annular frame members 91. Members 91 carry a combustion cylinder 92 axially disposed between cylinders 90. Extending axially through cylinders 90 and 92 is a shaft 93 having its ends supported in end walls 87. Reciprocally mounted on shaft 93 are a pair of piston assemblies 94 each comprising a compressor piston 95 for reciprocation in a cylinder 90 and a combustion or power piston 96 for reciprocation in cylinder 92. Each piston assembly has sealing means 97, such as piston rings or the like, disposed adjacent each end thereof for sealing contact with shaft 93. The combustion cylinder is provided with air intake ports 98 communicating with passage 89 and exhaust ports 99. Each compressor cylinder 90 has a plurality of air intake ports 100 in the end wall 87 controlled by conventional one-way valves 101 and a plurality of air outlet ports 102 leading to passage 89 and controlled by conventional one-way valves 103.

The shaft 93 may be centrally supported by a spider or like support 104. Conventional fuel injection means (not shown) are provided and may be associated with the central support.

Since the piston assemblies are fully supported on the shaft throughout their lengths, the possible deflection of the piston support shaft 93 relative to cylinder 92 is reduced to a minimum. Thus, it is possible to provide a clearance of minimum degree between the peripheries of pistons 96 and the walls of cylinder 92. Such clearance need not be greater than $\frac{1}{400}$ of the diameter of power cylinder 92 and may be considerably less.

Referring to FIGURE 2, 105 is a cylindrical casing and 106 are compressor cylinders axially arranged therein. The outer end of each cylinder 106 is supported in a generally conical frame member 107 carried by the casing and the inner end of each cylinder is supported on a centrally disposed generally cylindrical frame member 108. A passage 109 is formed between casing 105 and cylinders 106 and frame member 108, which may be integral with casing 105 or in fixed spaced relation therewith.

A combustion cylinder 110 is axially supported between cylinders 106 by means of a pair of webs 111 carried by frame member 108 and each engaging an outwardly projecting extension 112 of the cylinder 110. In the form shown, each extension 112 projects into a respective compressor cylinder 106.

Axially arranged within the casing and extending axially through the cylinders 106 and 110 is a shaft 113 having its ends supported in brackets 114 carried by frame members 107.

Reciprocally mounted on shaft 113 are a pair of piston assemblies 115 each comprising a sleeve 116 each end of which is provided with sealing means 117 for contact with the shaft. Fixed to each sleeve intermediate the ends thereof is a compressor piston 118 which has an outwardly extending conical portion 119 and a reversely or inwardly extending conical portion 120 the periphery of which cooperates with the respective cylinder 106. Such periphery may be provided with a piston ring 121 or the like for contact with the cylinder wall. Each piston assembly also comprises a power piston 122 having an inner end wall 123 fixed to the inner end of sleeve 116 and a skirt 124. Piston 122 is free from contact with the wall of the combustion area of cylinder 110 but the outer end of the skirt, which reciprocates in extension 112, may be provided with a piston ring 125 or the like.

The outer end of each sleeve 116 is supported for reciprocation in a conical web 126 carried by frame member 107. In the modification shown, it will be apparent that the reverse conical formation of member 107 and supporting web 126 permits reception therebetween of the conical portions 119 and 120 of the compressor piston 118. Web 126 may be provided with a piston or sealing ring 127 for engagement with the sleeve. The inner portion of sleeve 116 is supported in an inwardly directed tapered or conical member 136 carried by the combustion cylinder extension 112. Member 136 has a piston or sealing ring 137 for engagement with the sleeve. It will be apparent that the member 136 provides a conical recess 138 for reception of the conical portion 119 of the compressor piston. The compressor piston has a one-way valve 139 in portion 120 thereof.

Each end of the casing 105 may be provided with a protective cover 128 which encloses the projecting frame 107 and bracket 114.

The end of each compressor cylinder 106, as constituted by the frame member 107 and the web 126, is provided with air intake ports 129 controlled by conventional one-way valves 130, and air drawn in through such ports on the inward stroke of the piston is discharged through ports 131 in the cylinder 106 and controlled by conventional one-way valves 132 into passage 109 on the outward stroke of the piston. Air from passage 109 is charged into the combustion cylinder 110 through ports 133. The combustion cylinder is provided with exhaust ports 134 as well as conventional fuel injection means (not shown). Preferably, the outer surface of the combustion cylinder is insulated by bands of insulation 135. Each piston extension 112 may be provided with a chamber 140 for reception of cooling liquid.

I claim:

1. A free piston machine comprising a cylindrical member, a pair of compressor cylinders constituted by the end portions of said cylindrical member, each said compressor cylinder having an outer end wall and an inner end wall each supported on said cylindrical member, a combustion cylinder axially arranged within said cylindrical member and having each of its end portions supported on one of said inner end walls, a shaft extending axially through said cylinders and having its end portions fixedly supported in said outer end walls, a supporting frame fixed to said combustion chamber and supporting an intermediate portion of said shaft, and a pair of piston assemblies reciprocally mounted on said shaft, each said piston assembly comprising a compressor piston in one of said compressor cylinders and a combustion piston in said combustion cylinder.

2. A free piston machine comprising a cylindrical member, a pair of compressor cylinders constituted by the end portions of said cylindrical member, each said compressor cylinder having an outer end wall and an inner end wall each supported on said cylindrical member, a combustion cylinder axially arranged within said cylindrical member and having each of its end portions supported on one of said inner end walls, a shaft extending axially through said cylinders and having its end portions fixedly supported in said outer end walls, a pair of piston assemblies reciprocally mounted on said shaft, each said piston assembly comprising a sleeve slidably mounted on said shaft, a compressor piston fixed to said sleeve and disposed in one of said compressor cylinders, and a combustion piston fixed to said sleeve and disposed in said combustion cylinder, and a supporting frame fixed to each end of said combustion cylinder, said sleeve being in engagement with and supported by said supporting frames.

References Cited by the Examiner
UNITED STATES PATENTS

| 2,079,289 | 5/1937 | Janicke | 123—46 |
|---|---|---|---|
| 2,425,375 | 8/1947 | Kilchenmann | 123—46 X |

References Cited by the Applicant
UNITED STATES PATENTS

| 2,494,573 | 1/1950 | Mueller. |
| 2,878,990 | 3/1959 | Zurcher. |

FOREIGN PATENTS

| 53,523 | 8/1937 | Denmark. |
| 768,155 | 8/1934 | France. |
| 199,017 | 7/1935 | Switzerland. |

MARK NEWMAN, *Primary Examiner.*

W. E. BURNS, *Assistant Examiner.*